Sept. 5, 1967   C. G. GORDON ETAL   3,339,572
ELECTRO-HYDRAULIC SERVO VALVE
Filed Jan. 25, 1965
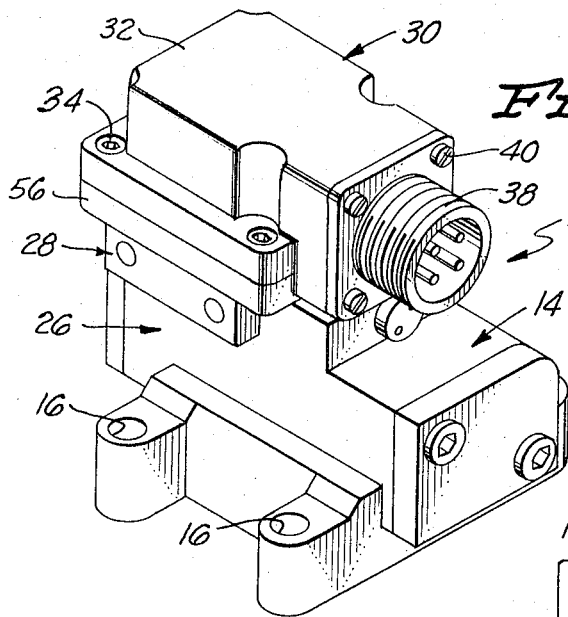
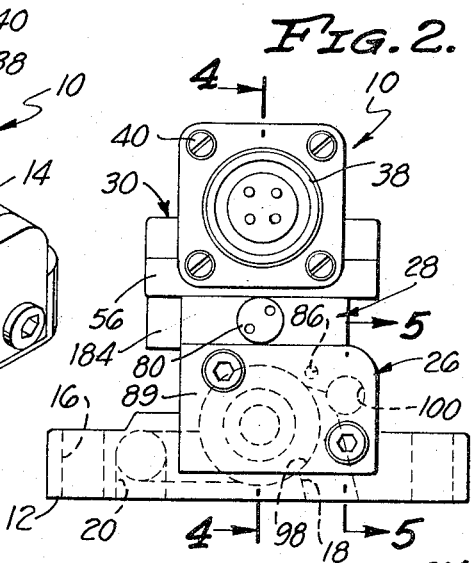
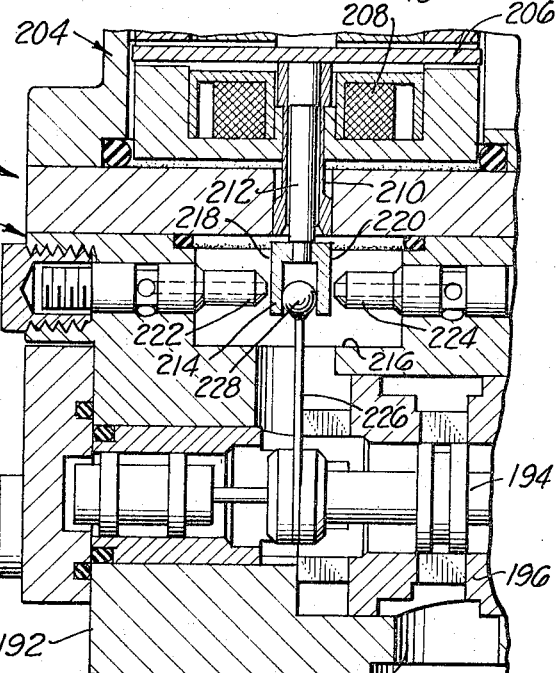
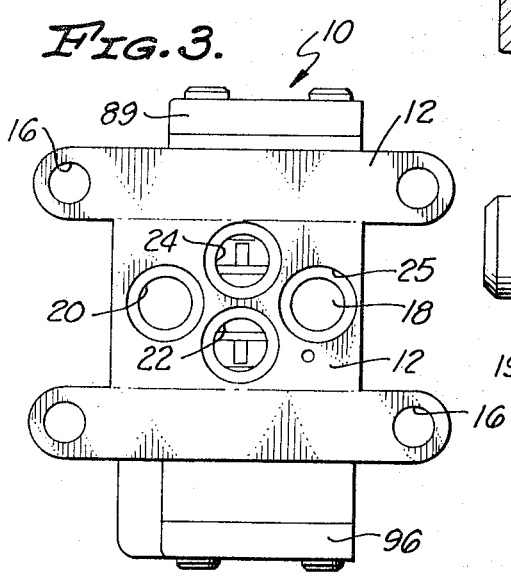
INVENTORS
CARROLL G. GORDON
WILLIAM F. STOESSER
BY  EDWARD D. O'BRIAN
ATTORNEY

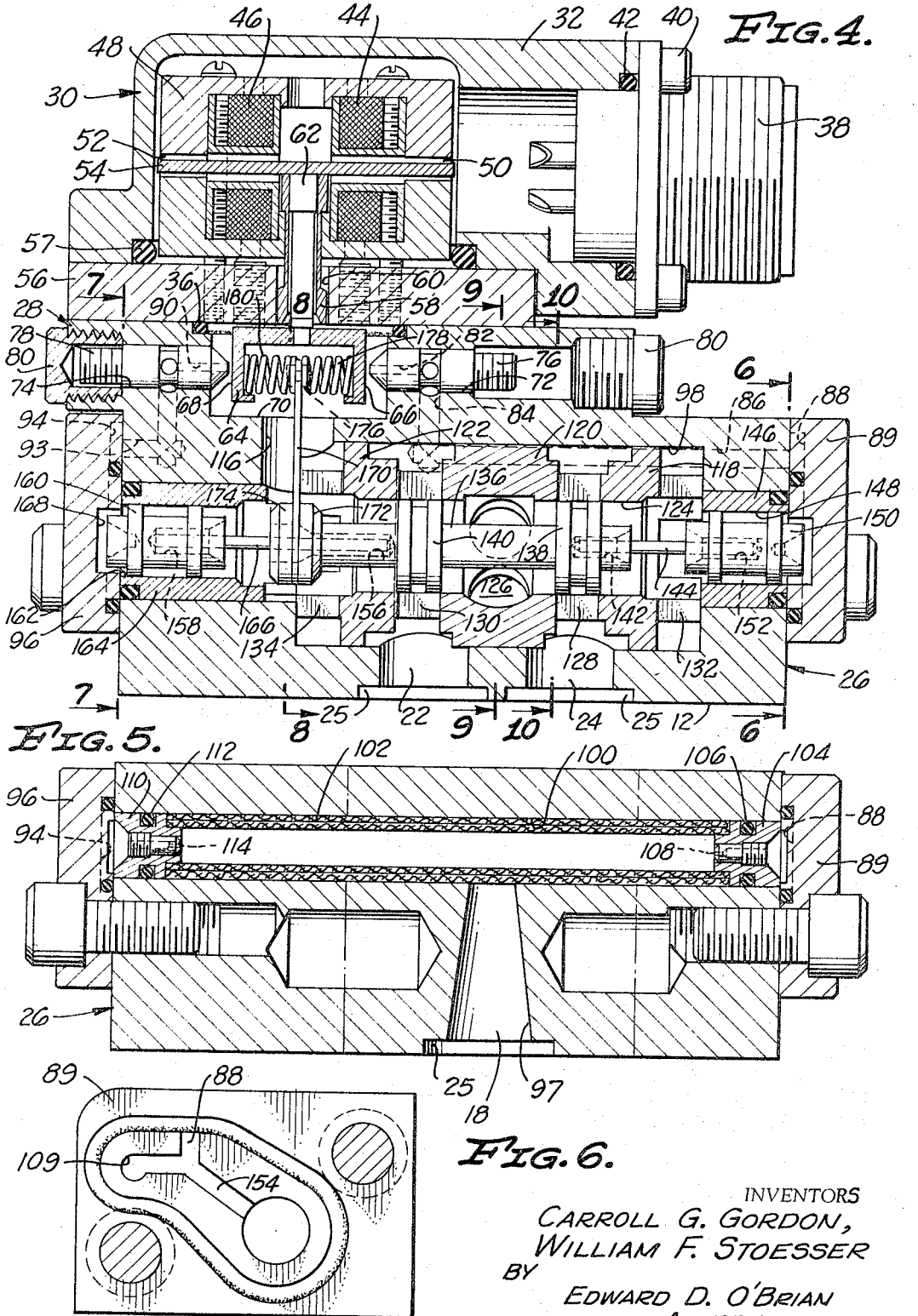

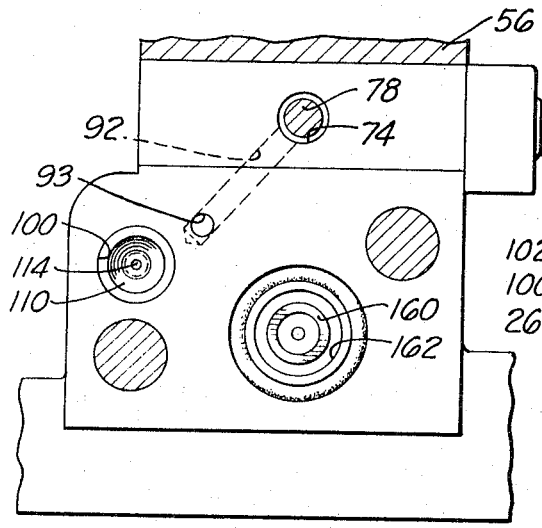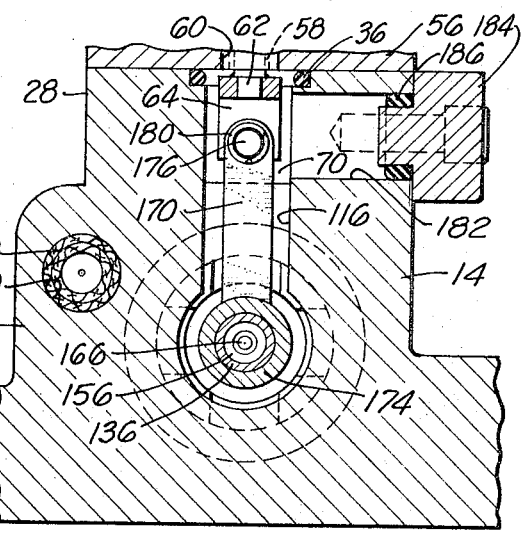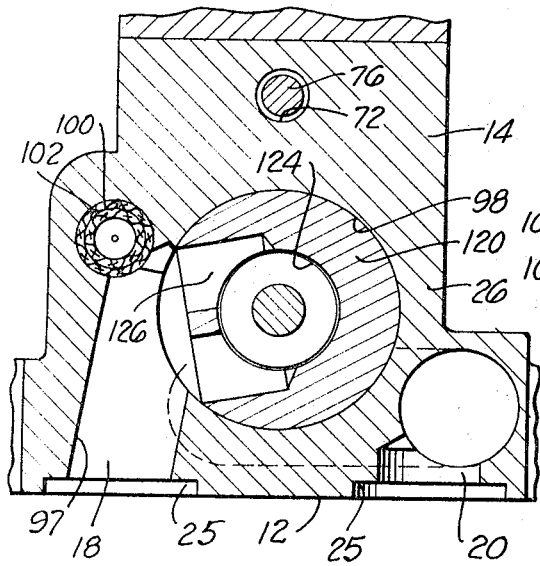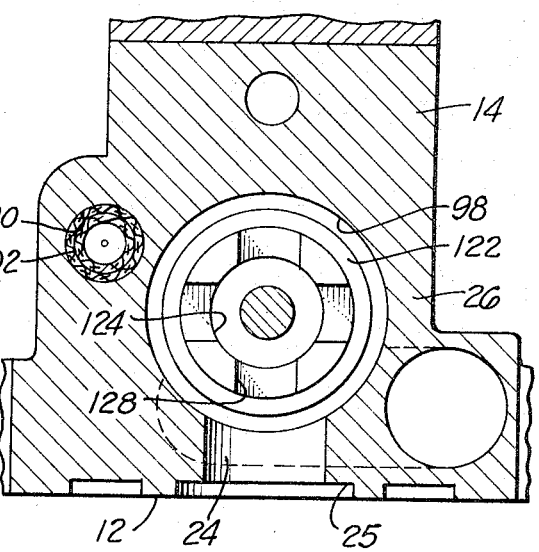

United States Patent Office 3,339,572
Patented Sept. 5, 1967

3,339,572
ELECTRO-HYDRAULIC SERVO VALVE
Carroll G. Gordon, 3 William Court, Menlo Park, Calif. 94025, and William F. Stoesser, 3366 Fayette Drive, Mountain View, Calif. 94040
Filed Jan. 25, 1965, Ser. No. 427,852
3 Claims. (Cl. 137—85)

This invention is directed to an electro-hydraulic servo valve, particularly a valve structure which is highly sensitive and highly linear.

In the art of control systems situations often occur where a small signal is all that is available to control a large force. To meet this demand electro-hydraulic valves have come into being. In these valves an electric signal controls a hydraulic valve so that a hydraulic system can supply the necessary large forces and powers. Continuing efforts have been made in the electro-hydraulic valve field to make the valve as completely responsive to the electric signal as possible so that the hydraulic results are a direct analogue of the original electric signal. Prior valves have been quite accurate in developing the hydraulic analogue, but requirements have demanded even greater accuracy than has been available.

Accordingly, it is an object of this invention to provide an electro-hydraulic servo valve which is more sensitive and linear in response to its hydraulic output as compared to its electric input so that more accuracy and precision results from the use of the valve.

It is another object of this invention to provide an electro-hydraulic servo valve which eliminates all pivots so that pivotal friction does not have an effect upon the response characteristics of the valve.

It is another object of this invention to provide an electro-hydraulic servo valve which contains a built-in hydraulic amplifier to create the necessary forces for valve actuation from small electrical signals, and to provide a substantially frictionless mechanical feedback from the main hydraulic control valve to the amplifier to provide proper responsiveness in the amplifier.

Further objects and advantages of this invention will become apparent from a study of the following portion of the specification, the claims and the attached drawings in which:

FIG. 1 is an isometric view of the electro-hydraulic servo valve of this invention;

FIG. 2 is a right hand elevation thereof;

FIG. 3 is a bottom plan view thereof;

FIG. 4 is an enlarged section taken generally along the line 4—4 of FIG. 2;

FIG. 5 is an enlarged section taken generally along the line 5—5 of FIG. 2;

FIG. 6 is a section taken along the line 6—6 of FIG. 4;

FIG. 7 is a section taken generally along the line 7—7 of FIG. 4;

FIG. 8 is a section taken generally along the line 8—8 of FIG. 4;

FIG. 9 is a section taken generally along the line 9—9 of FIG. 4;

FIG. 10 is a section taken generally along the line 10—10 of FIG. 4; and

FIG. 11 is a partial sectional view of an alternative embodiment.

As an aid to understanding this invention it can be stated in essentially summary form that it is directed to an electro-hydraulic servo valve. The valve comprises three primary inter-related functional portions. The electrical signal is fed into a torque motor wherein the electrical signal is converted into a mechanical signal in the form of mechanical displacement. This mechanical signal is the input signal to a hydraulic amplifier which works on a flow division principle and is supplied with mechanical feedback. First and second hydraulic fluid streams are fed to a signal point where the mechanical displacement of the torque motor varies the pressure drop and accordingly the flow of one of these streams as compared to the other. This difference in flow is read as a pressure at the main valve spool. The main valve spool is of four-way two land reversible structure and is supplied with a control piston at each end thereof. Each of these control pistons is controlled by the signal pressure from the hydraulic amplifier so that spool displacement within its body is a function of the electrical signal. Mechanical feedback from the main spool is provided to the mechanical signal from the torque motor so that signal cancellation occurs when the main spool has moved an amount appropriate to the original electrical signal. Thus, motion of the main spool is a direct analogue of the electrical signal. Furthermore, the ports of the main valve body and the spool lands cooperating therewith are formed in such a manner that motion of the main spool provides the proper flow in the various ports associated therewith. In order to provide a complete electro-hydraulic servo valve with minimum loss, and thus maximum correspondence of the output signal to the input signal, the entire mechanical system is managed without pivot bearing structures. Accordingly, any loss in responsiveness due to such bearings is eliminated and by the present electro-hydraulic servo valve and maximum analogue correspondence of the output as compared to the input is achieved.

This invention will be understood in greater detail by reference to the following portion of the specification wherein the drawings are described. Referring now to FIG. 1, the electro-hydraulic valve of this invention is generally indicated at 10. While the valve 10 can be mounted in any position, for convenience of reference, it will be described in the orientation shown in FIG. 1. Valve 10 has a substantially planar bottom 12 on the main valve body 14, and body 14 has mounting holes 16 therethrough so that the body 14 may be secured in close fitting fashion to any desired mounting surface. While it is possible to put screw threads into the main valve body for the purpose of connecting hydraulic lines thereto, it is considered more desirable to mount the main valve body 14 against a planar mounting surface and provide the mounting member carrying this mounting surface with suitable hydraulic connections. Ports in the mounting structure correspond to the ports in the bottom of body 14. These ports include hydraulic fluid pressure port 18, drain port 20 which returns the hydraulic fluid to the reservoir, and first and second cylinder ports 22 and 24. Sealing of these ports with respect to the mounting structure is accomplished by the provision of a suitable conventional ring seal within the ring seal grooves 25.

The lower portion of the body 14, the portion generally indicated at 26, contains the porting of structure of the main hydraulic fluid control valve. The upper portion of the main body, indicated at 28, can be termed the hydraulic amplifier, or pilot valve section, for it contains the porting and structure related to the amplifier portion of the entire mechanism. The torque motor portion is indicated at 30.

Torque motor 30 is mounted within housing 32 which is secured to hydraulic amplifier 28 by means of suitable screws 34 and is sealed with respect thereto by means of ring seal 36. Standard electrical connector 38 is secured to housing 32 by means of screws 40 and is sealed with respect thereto by means of ring seal 42. Electrical connector 38 permits the connection of an external plug from the electric signal source to the coils in torque motor 30. Torque motor 30 is an electro-mechanical device for converting a small electrical signal into a mechanical displacement. To accomplish this, electric coils 44 and 46 are each wound of a plurality of turns of electric wire, insulated from each other and insulated from the remainder of torque motor 30. Coils 44 and 46 are mounted in suitable laminations 48 which direct the magnetic flux thereof in the appropriate direction. Permanent magnets are also associated with the laminations 48, as is conventionally known, so as to aid in directing the flux of coils 44 and 46 and to cause a magnetic path in the right direction. Laminations 48 define air gaps 50 and 52 across from which the magnetic flux from coils 44 and 46 as well as the permanent magnets is directed. Laminations 48 are closed above and below the air gaps 50 and 52 in the plane at right angles to the plane of FIG. 4.

Armature 54 is of suitable material as to be acted upon by the magnetic flux created by the coils and permanent magnet arrangement, and as is well known in the art, the coils and permanent magnets are positioned in such a manner that upon energization of coils 44 and 46 by suitable signals, armature 54 is urged to move in one direction or another. Intermediate plate 56 is a part of the torque motor 30 and is sealed thereto by ring seal 57. Plate 56 has tube 58 secured at its lower end in bore 60 therein. Tube 58 is thin walled at its center so as to be of flexible nature and is secured at its upper end to the center of armature 54. Thus, armature 54 can move within the air gaps by flexure of tube 58. Positioned within tube 58 and secured at its upper end to armature 54 is rod 62. Rod 62 carries yoke 64 at its lower end. The entire structure is such that yoke 64 moves generally to the left and right within the plane of FIG. 4 upon energization of coils 44 and 46. Furthermore, the amount of motion of yoke 64, and its direction of motion is respectively proportional to the amount of energization of the coils and to the polarity of their energization. Yoke 64 is provided with planar valving surfaces 66 and 68 to supply the position signal to the hydraulic amplifier section 28.

The hydraulic amplifier section comprises chamber 70 in the upper part of main valve body 14. Yoke 64 is positioned within the chamber 70, bores 72 and 74 enter into the chamber 70 from outside of the valve body 14 and each of the bores 72 and 74 contains an orifice nozzle structure 76 and 78. Each of these orifice nozzle structures is adjustable within its bore and each has a cap 80 to close the respective bores. Nozzle 76 has an orifice 82 which is adapted to direct the stream of hydraulic fluid under pressure into the chamber 70. Inner drilling 84 is arranged to supply hydraulic fluid under pressure and is connected to bore 82. Inner drilling 86, see FIG. 2, intersects with the inner drilling 84 and extends from the inner drilling 84 to the cavity 88 in end cap 89.

Similarly, orifice nozzle structure 78 contains an orifice 90 which is adapted to direct a jet of hydraulic fluid under pressure into chamber 70. Orifice 90 is connected by inner drilling 92 which intersects with further inner drilling 93, which enters cavity 94 in cap 96.

Pressure port 18, see FIG. 9, comprises a bore 97 extending angularly upward within the main valve body 14 so that it intersects both with valve sleeve mounting bore 98 and with flow divider bore 100. Flow divider bore 100 contains filter 102 which extends longitudinally thereof. At the right end of filter 102, as seen in FIG. 5, is orifice fitting 104 which is sealed with respect to the bore by means of ring seal 106. Orifice fitting 104 contains orifice 108 which permits hydraulic fluid under pressure to flow from the interior of filter 102 to flow into cavity 109 in the end cap 89. Since this cavity is connected through cavity 88 to nozzle bore 82, fluid flowing therethrough eventually passes out of nozzle bore 82. Similarly, flow divider bore 100 contains orifice fitting 110 sealed with respect thereto by means of ring seal 112 and containing orifice 114. Orifice 114 discharges hydraulic fluid into the cavity 94 within cap 96. Chamber 70 is open to drain 20 through bore 116 and appropriate inner drilling within valve body 14, as shown in FIGS. 2, 9 and 10. Thus, when hydraulic fluid under pressure is supplied at pressure port 18, hydraulic fluid flow is divided by parallel flow through orifices 108 and 114 and thence each delivers fluid to nozzle bores 82 and 90, respectively. In view of the fact that pressure drop through the orifices is a function of flow, it can be seen that motion of the yoke 64 in moving its planar valving surfaces 66 and 68 with respect to the orifice nozzle structures 76 and 78, respectively, causes changes in flow out of the bores 82 and 90. Thus, the pressure within the cavities 88 and 90 varies, depending on the position of yoke 64. It is this pressure change that is used to cause changes in position of the main valve spool.

The main valve section 26 contains the valve sleeve mounting bore 98 in which the valve sleeves are mounted which cooperate with the main valve spool to cause porting of hydraulic fluid under pressure from the pressure port 18 to one or the other of the cylinder ports 22 and 24 selectively, and to the drain or reservoir port 20. To accomplish this function valve sleeves 118, 120 and 122 are formed to the particularly required configuration and are positioned within bore 98. The sleeves are inserted within the bore 98 when the main valve body 14 is at an intermediate state of manufacture. After this insertion, the main valve body 14 is furnace brazed so as to make it an essentially unitary structure. While the main valve body 14 is in its separate parts, the necessary inner drillings are made for connection between the various ports. After assembly, as is shown in FIG. 4, the valve sleeves 118, 120 and 122 define an interior bore 124 which has an interior opening 126 to pressure port 18 and which has ports 128 and 130 open to the second and first cylinder ports 24 and 22, respectively. Ports 128 and 130 are in the form of slots ground in the ends of sleeves 118 and 122, respectively, so as to maintain the proper spacing between the sleeves. Furthermore, sleeve 118 has slotted port 132 open to drain port 20 and sleeve 122 has slotted port 134 also open to drain port 20 through suitable inner drilling.

Valve spool 136 is positioned within bore 124, and carries lands 138 and 140 which respectively substantially cover ports 128 and 130. Depending on the particular characteristics desired in the valve, the lands 138 and 140 may be slightly underlapped or slightly overlapped with respect to their ports. Thus, a two landed spool reversing valve is defined.

The right hand of valve spool 136 contains a "center" recess 142 into which compression bar 144 is inserted. Compression bar 14 has sharp points on each of its ends so that minimum bearing friction is obtained. Positioned within the right end of main valve body 14 so as to be coaxial with bore 98 and bore 124 is cylinder 146 having bore 148. Positioned within the cylinder bore 148 is piston 150 which has two piston ring lands thereon so that it has proper guidance within cylinder bore 148 with minimum friction with respect thereto. Piston 150 also contains "center" recess 152 which carries the other end of compression bar 144. Cylinder bore 148 is open to cavity 88 through cavity 154 and is acted upon by the pressure therein.

Similarly, the other end of valve spool 136 contains "center" recess 156 which faces center recess 158 in control piston 160. Control piston 160 is reciprocably positioned in cylinder 162 which is located in cylinder sleeve 164 so that it is concentrically positioned with respect to bore 124. Compression bar 166 has pointed ends and engages in the bottom of center recesses 156 and 158 so that hydraulic pressure urging piston 160 to the right urges valve spool 136 to the right. Cap 96 is symmetrically similar to cap 89 so that the cavity 168 at the end of piston 160 is in hydraulic communication with cavity 94 which in turn is in communication with both nozzle 90 and orifice 114.

In addition to lands 138 and 140, which operate in association with ports 128 and 130, the valve spool 136 carries feedback spring 170. In order to suitably carry the feedback spring 170, spool 136 carries boss 172 against which spring 170 is positioned and nut 174 which tightens feedback spring 170 against the boss. Accordingly, feedback spring 170 is securely positioned at its lower end, as seen in FIGS. 4 and 8, to valve spool 136 so that its lower end follows the movement of the spool. The upper end of feedback spring 170 carries spring boss 176. Compression springs 178 and 180 are positioned within yoke 64 and embrace the upper end of feedback spring 170. The spring boss 176 maintains compression springs 178 and 180 in position. By this means, resilient mechanical feedback is accomplished between valve spool 136 and armature 54.

In order to aid in the final assembly of the valve, chamber 70 is open to the exterior of main valve body 14 through access opening 182, see FIG. 8. Access opening 182 is of sufficient size so as to permit entry and positioning therethrough of compression springs 178 and 180 so that they are positioned within the yoke 64 and retain the feedback spring 170 therebetween. Closure of access opening 182 is accomplished by cap 184 which is sealed by ring seal 186. After this final assembly operation is completed, the valve 10 is ready for adjustment and operation.

The physical structure of the valve itself is such that when all elements are in the unstressed position, lands 138 and 140 are symmetrically positioned with respect to ports 128 and 130. In this condition it is necessary to adjust the orifice nozzle structures 76 and 78 so that the pressure against pistons 150 and 160 is equal, so as to maintain spool 136 in the centered position. After this is accomplished, the valve is ready for use.

In operation the electro-hydraulic valve 10 is secured to a suitable mounting plate by means of bolts through mounting holes 16. The mounting plate has openings therein corresponding to pressure port 18, drain port 20, first cylinder port 22 and second cylinder port 24. These openings are suitably hydraulically connected so that the port 18 is supplied with hydraulic fluid under suitable pressure and in adequate quantity while reservoir port 20 is connected to return the exhaust hydraulic fluid back to the reservoir. The cylinder ports 22 and 24 are connected to the opposite ends of a double acting cylinder which is connected to perform the desired work function, or to any other convenient and suitable hydraulic motor.

Electric signal supply means is connected to electrical connector 38. The electric signal is of suitable nature so as to deflect the armature 54 in accordance with the character of the signal. Preferably, the signal has such a change in its amplitude and polarity so that maximum change in the signal results in maximum difference in positionining of spool 136, to at least the terminal points where linearity of flow with respect to deflection therebetween is reasonably assured. With such connection, the electro-hydraulic valve 10 is ready for operation.

Assuming that no electrical signal is provided to the coils 44 and 46, yoke 64 remains undeflected. Hydraulic fluid flows under pressure through port 18, passes through passage 97, see FIG. 9, and through filter 102. The hydraulic fluid flows through both orifices 108 and 114 with pressure drop through the orifices in accordance with downstream conditions. The downstream pressure of the hydraulic fluid past orifices 108 and 114 is respectively applied to pistons 150 and 160. This same pressure is communicated through inner drillings 86 and 92 to orifice nozzle structure 76 and 78, respectively. These nozzles impinge respectively on the valving surfaces 66 and 68 of yoke 64, and since yoke 64 is not deflected due to the lack of electrical signal in coils 44 and 46, and due to the previous adjustment of the valve, the flow through the nozzles 82 and 90 and impinging on these valving surfaces is such as to maintain the hydraulic fluid pressure on pistons 150 and 160 equal. Assuming that the hydraulic characterstics of each circuit are the same, and they are the same as nearly as reasonable engineering tolerances permit, the flow through nozzle bores 82 and 90 is equal when the spacing of the valving surfaces 66 and 68 from the respective nozzle bases is equal. Under these circumstances valve spool 136 will not change in position.

Assuming that the main valve is a zero lap valve, that is the space between lands 138 and 140 is exactly equal to the distance between the edges of ports 128 and 130, and assuming a perfect valve, no flow will take place from the pressure port into either of the cylinder ports. It is noted that in the zero lap valve the total distance across each land is equal to the corresponding port opening, and in such a case there is no exhaust flow from either cylinder port to drain 20.

In actual practice it is often more convenient, and linearity is more easily and accurately obtained by underlap construction. In this construction the distance between lands 138 and 140 is slightly greater than the distance between the ports, and the land width is slightly less than the port opening so that a continuous flow of relatively small magnitude passes into pressure port 18, past the restriction of the edge of each land with respect to its port opening, through the adjacent portion of ports 128 and 130, past the outer edges of the lands 138 and 140 to drain port 20. With these openings the same, the pressure drop is the same and equal pressures are applied to cylinder ports 22 and 24 so that no motor motion occurs. In either case, the valve is centered and no motor motion results.

Assuming now that an electrical signal is applied, and the signal is of a particular polarity in half the maximum amplitude, and that the signal is such as to require that the motor accept hydraulic fluid under pressure from port 22 and return hydraulic fluid to drain through port 24, the signal is appropriate to move armature 54 in such a direction as to move yoke 64 to the right. Such motion is permitted by flexure of tube 58, and the resiliency of springs 170, 178 and 180. When yoke 64 moves to the right, surface 66 moves closer to the face of nozzle structure 76 so that flow is restricted to a greater degree out of nozzle bore 82. Such restriction raises the pressure on piston 150 and increases the urging of spool 136 to the left, as seen in FIG. 4. This same action opens the space between the surface 68 and nozzle 190 so that an increase in flow is permitted to pass therethrough with the consequent reduction pressure upon piston 160. These changes in hydraulic fluid pressure on pistons 150 and 160 move spool 136 to the left. Such motion causes land 140 to move to the left, thereby opening pressure channel 97 and openings 126, which have the hydraulic fluid under pressure in them, to a greater degree to port 130. Therefore, an increased amount of fluid flows therethrough. Similarly, when land 138 moves to the left, as seen in FIG. 4, port 128 becomes more opened to the interior of the valve bore 124 to the right of land 138. This area is connected through port 132 to drain 20. Accordingly, the motor moves at a rate dictated by the flow.

This same motion of valve spool 136 to the left causes the secured, lower end of feedback spring 170 to move to the left the corresponding amount. Spring 170, through springs 178 and 180, resiliently urges yoke 64 to the left, and as valve spool 136 is moving to the left during the original portion of the deflection, this urge increases until the yoke 64 is moved back toward its central position where new force balance is obtained. This force balance includes the electro-magnetic stress on armature 54 being balanced against the mechanical stress of feedback spring 170 upon yoke 64, and the force of spring 170 is balanced by a difference in pressure upon the pistons 160 and 170. Since a difference of pressure is necessary at that point to work against the force of spring 170, yoke 64 does not return quite to its centered position, but an appropriate deflection of each of the moving components of this structure finds a total new balance situation. In this balance situation the electrical signal is reflected in these deflections, but particularly in the deflection by new positioning of spool 136. In this new position hydraulic flow to the motor is such as to maintain it at approximately half speed in accordance with the half speed electrical signal applied to coils 44 and 46.

When the valve is in this situation a further increase in signal of the same polarity will cause further deflection of yoke 64 and cause the hydraulic amplifier to cause further motion of spool 136 to the left. The entire structure is arranged so that, as nearly as possible, the hydraulic flow is a direct analogue of the electrical input signal. Reversal of the electrical polarity will move the spool 136 to the right to seek a position wherein the hydraulic flow of fluid under pressure out of port 128 will be proportional to the new signal. Similarly, if the signal is removed, the hydraulic amplifier will again cause the spool 136 to become centered so that there is no net flow out of either of ports 128 or 130.

The particular mechanical structure of electrohydraulic valve 10 is such as to cause it to be particularly sensitive to small electrical signals and small changes in electrical signals. Mechanical friction is the final cause for non-sensitivity in this regard, and in the instant construction mechanical friction has been reduced to a minimum. For example, thin walled tube 58 provides support for mechanical movement of armature 54. Deflection of tube 58 has no mechanical friction and only a small amount of non-elastic hysteresis. Similarly, the feedback from spool 136 through feedback spring 170 and compression springs 178 and 180 also eliminates all pivotal and sliding mechanical friction loss points. Compression bars 144 and 166 transmit force through sharp points at each end thereof so as to minimize mechanical friction in the transmission of force from the piston to the spool. Only the actual sliding motion of the pistons in their cylinders and the spool within its bore provides any mechanical friction in this structure. Accordingly, hydraulic analogue responsiveness of valve 10 to its input signal is superior to that previously obtainable.

Referring now to the alternative embodiment shown in FIG. 11, an inspection of this figure shows that it is a partial section similar to the section shown in FIG. 4 of the preferred embodiment. Each of the various components of the preferred embodiment has a corresponding structure in the alternative embodiment. Accordingly, only the differences will be described. The electro-hydraulic servo valve 190 has a main valve body 192 which contains a spool 194 and ported sleeves 196 which are arranged to control the flow of hydraulic fluid under pressure through ports 198 in the bottom 200 of valve 190. The plurality of ports 198, together with their arrangement of sleeves 196 and the arrangement of spool 194 are identical to the ports, sleeves and spools in the previously described embodiment. Thus, fluid flow is controlled in the previously described manner.

Servo valve 190 has an amplifier section 202 and an electro-mechanical torque motor 204. Torque motor 204 has an armature 206 which is related to coils 208 to be moved thereby, in the manner previously described with respect to the electro-hydraulic servo valve of FIG. 4. Armature 206 is mounted on thin walled tube 210 so that it may move with respect to valve body 192. Armature 206 carries rod 212 which extends through the center of tube 210 and terminates in yoke 214 positioned in pocket 216 in amplifier section 202. Yoke 214 has planar valving surfaces 218 and 220 which respectively act in cooperation with orifice nozzle structures 222 and 224. Orifice nozzle structures 222 and 224 are respectively supplied with hydraulic fluid under pressure in the manner described with respect to the orifice nozzle structures 76 and 78. Thus, the position of yoke 214 with respect to these nozzles controls the pressures at the respective ends of spool 194 for controlling its position.

Leaf spring 226 is mounted upon spool 194 in the same manner that leaf spring 170 is mounted upon spool 136, and thus its lower end, as seen in FIG. 11, moves with the spool. The upper end of leaf spring 226 carries ball 228 secured thereto such as by brazing. Ball 228 fits closely between the arms of yoke 214. The fit is such that minimum play is permitted in the direction axial to spool 194 and yet sufficient freedom is available to minimize friction as the ball 228 moves within the arms of yoke 214 in a direction at right angles to the axis of spool 194.

From this structure it is seen that motion of the armature 206 causes motion of the yoke 214 with consequent changes in valving from the orifice nozzle structures 222 and 224 which in turn changes the pressures which are available to move spool 194 in the axial direction thereof, and such movement causes forces through leaf spring 226, ball 228 and yoke 214 to tend to return yoke 214 until there is a balance of forces. Thus, the structure of FIG. 11 is substantially functionally identical to the structure of FIG. 4. In the structure of FIG. 4, spring deflection upon movement of spool 136 is taken both in the leaf spring and in the coil springs, and accordingly the total spring values therein should equal the spring value of leaf spring 226 and the structure of FIG. 11, if feedback ratios are to be the same. The ball 228 has the advantage over coil springs 178 and 180 in that it causes less radial force on spool 194. However, when the clearance of ball 228 within yoke 214 is sufficient to minimize this radial force, axial end play may be excessive. Accordingly, the clearance between ball 228 and the arms of yoke 214 must be compromised between these two factors for maximum performance characteristics.

This invention having been described in its preferred embodiment and an alternative embodiment, it is clear that it is susceptible to numerous modifications and changes within the skill of the routine engineer and without the exercise of the inventive faculty. Accordingly, the scope of this invention is defined by the scope of the following claims.

We claim:
1. An electro-hydraulic servo valve, said electro-hydraulic servo valve comprising:
   an electro-mechanical torque motor, a mechanical-hydraulic amplifier, a hydraulic-mechanical motor and a mechanical-hydraulic main valve;
   said torque motor comprising electromagnetic coils and an armature movably mounted within said torque motor so as to be acted upon by magnetic flux caused by electrical energization of said coils, said electro-hydraulic servo valve having a body, said coils being rigidly mounted with respect to said body and said armature being resiliently mounted with respect to said body, a member mounted on said armature so as to move in accordance with motion of said armature with respect to said coils, said member comprising an element secured to said armature and a yoke secured to said element;
   said amplifier comprising means adapted to supply hydraulic fluid under pressure, dividing means adapted to divide hydraulic fluid into first and second streams, first and second nozzles directing said first and second streams against said member, said first and second nozzles being mounted on said body, said member being so positioned with respect to said nozzles that motion of said member with respect to said body changes the relative pressure in said first and second streams;
   said hydraulic-mechanical motor comprising movable means movable with respect to said body and connected to said first and second streams so that said movable means moves with respect to said body in response to changes in hydraulic fluid pressure in said first and second streams, said movable means being connected to said main valve to control the position of said main valve;
   said main valve comprising a spool mounted within said body, lands on said spool and ports in said body, hydraulic fluid connection conduits in said body connected to said ports, said lands being related to said ports so as to control flow of hydraulic fluid between said ports, and resilient means connected between said spool and said member, said resilient means comprising a leaf spring secured to said spool and first and second compression springs engaged within said yoke and engaging said leaf spring so that motion of said spool caused by said movable means resiliently urges said member.

2. The electro-hydraulic servo valve of claim 1 wherein said yoke has first and second valving surfaces, said first and second nozzles being directed to direct hydraulic fluid under pressure against said first and second valving surfaces, respectively, so that motion of said yoke with respect to said nozzles causes changes in flow of hydraulic fluid under pressure through said nozzles.

3. An electro-hydraulic servo valve, said electro-hydraulic servo valve comprising:

an electro-mechanical torque motor, a mechanical-hydraulic amplifier, a hydraulic-mechanical motor and a mechanical-hydraulic main valve;

said torque motor comprising electro-magnetic coils and an armature movably mounted within said torque motor so as to be acted upon by magnetic flux caused by electrical energization of said coils, said electro-hydraulic servo valve having a body, said coils being rigidly mounted with respect to said body and said armature being resiliently mounted with respect to said body, a member mounted on said armature so as to move in accordance with motion of said armature with respect to said coils;

said amplifier comprising means adapted to supply hydraulic fluid under pressure, dividing means adapted to divide hydraulic fluid into first and second streams, first and second nozzles directing said first and second streams against said member, said first and second nozzles being mounted on said body, said member being so positioned with respect to said nozzles that motion of said member with respect to said body changes the relative pressure in said first and second streams;

said hydraulic-mechanical motor comprising movable means movable with respect to said body and connected to said first and second streams so that said movable means moves with respect to said body in response to changes in hydraulic fluid pressure in said first and second streams, said movable means being connected to said main valve to control the position of said main valve, said movable means comprising first and second pistons respectively mounted within first and second cylinders, said first and second streams being connected to act upon said first and second pistons respectively;

said main valve comprising a spool mounted within said body, said first and second pistons being substantially axially aligned with said spool, first and second compression bars respectively mounted between said first and second pistons and said spool, said first and second compression bars having substantially sharp pointed ends and being in engagement with substantially conical cavities within said pistons and within said spool, lands on said spool and ports in said body, hydraulic fluid connection conduits in said body connected to said ports, said lands being related to said ports so as to control flow of hydraulic fluid between said ports, and resilient means connected between said spool and said member so that motion of said spool caused by said movable means resiliently urges said member.

References Cited
UNITED STATES PATENTS

| | | | |
|---|---|---|---|
| 2,995,116 | 8/1961 | Dobbins | 91—387 X |
| 3,023,782 | 3/1962 | Chaves | 137—85 |
| 3,065,735 | 11/1962 | Chaves | 91—387 |

ALAN COHAN, *Primary Examiner.*